United States Patent [19]
Campbell

[11] 4,151,673
[45] May 1, 1979

[54] AUTOMATIC REACTIVATING TRAP

[76] Inventor: Delmer E. Campbell, 1903 South Ave., Springfield, Mo. 65807

[21] Appl. No.: 874,428

[22] Filed: Feb. 2, 1978

[51] Int. Cl.² .................. A01M 23/08; A01M 23/04
[52] U.S. Cl. .......................................... 43/67; 43/69
[58] Field of Search ............... 43/64, 65, 67, 69, 73, 43/66

[56] References Cited
U.S. PATENT DOCUMENTS 4,103,448  8/1978  Souza ........................................ 43/67

*Primary Examiner*—Nicholas P. Godici
*Assistant Examiner*—K. Bradford Adolphson
*Attorney, Agent, or Firm*—D. A. N. Chase

[57] ABSTRACT

An animal trap includes a box-like housing having a capture compartment and a storage compartment. An elevated access opening is presented on one side of the housing and is adjacent to a primary platform which is pivotally mounted in the capture compartment and has a normal, level condition and a tilted, capture position. In its normal condition, the primary platform blocks passage to the storage compartment; in its tilted position the elevated access opening is blocked and the storage compartment is accessible. A tilt booster is carried by the primary platform and presents a secondary platform or plank arranged on a fixed fulcrum in a manner to cause sudden tilting of the primary platform under the weight of an animal and blocks its escape.

9 Claims, 7 Drawing Figures

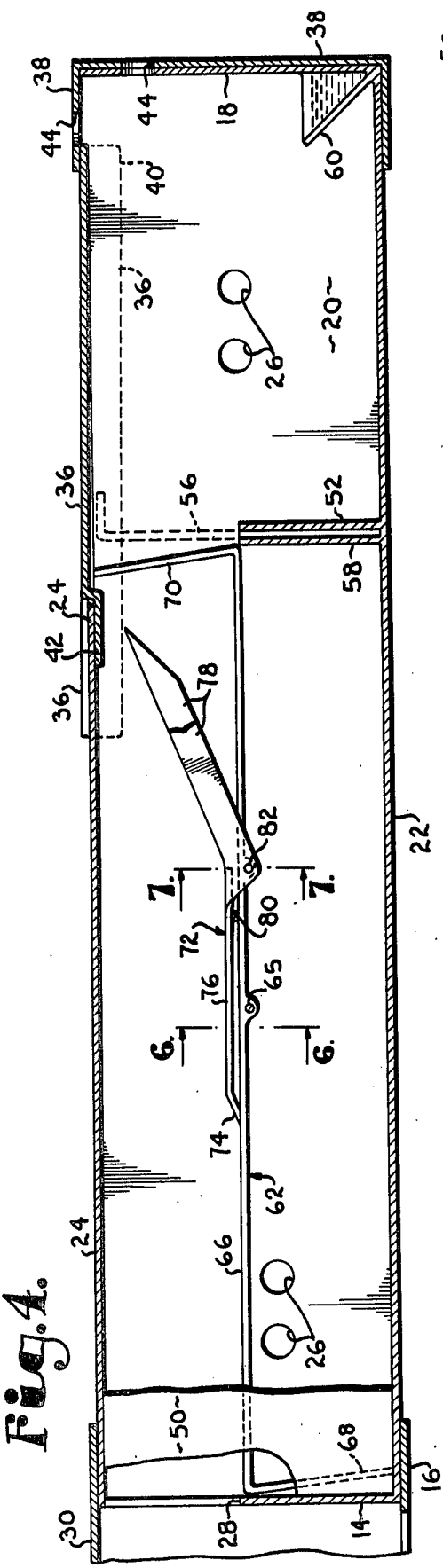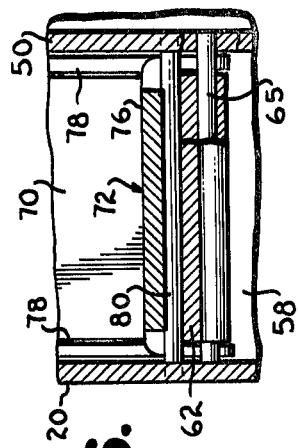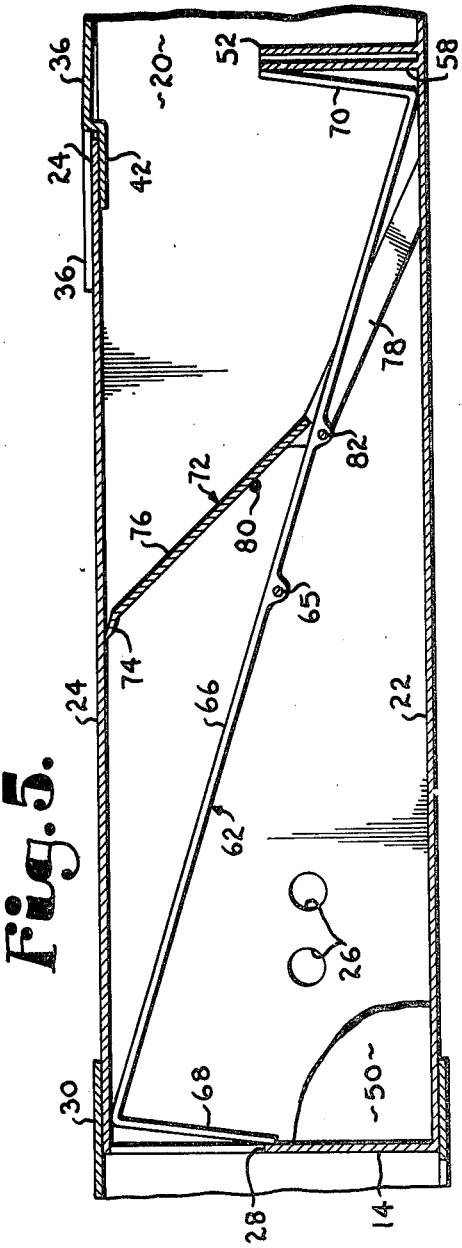

AUTOMATIC REACTIVATING TRAP

BACKGROUND AND SUMMARY OF INVENTION

Animal traps in previous use, particularly those specifically adapted to capture rodents, have employed single tilting platforms and trapdoors. Since a rodent's back legs are its most powerful and its center of gravity is somewhat rearwardly located, in prior art traps a rodent can sometimes reverse its path after its front legs engage the trapdoor or start the platform to tilt. This partial activation of a trap and then reversal of rodent path causes the trap to deactivate and allows the rodent to escape.

Rodents are climbers and some would rather climb into something than enter on the same level. Therefore, a trap whose access opening is raised above the ground presents a more attractive opening for these rodents to investigate due to their climbing instincts. Additionally, rodents generally prefer to enter and advance along what appears to be a solid runway rather than one that is interrrupted or uneven.

It is, therefore, an important object of the present invention to provide an animal trap of the tilting platform type wherein the tilting of the platform is sudden and without warning to the animal, and escape is prevented.

It is also a general object of this invention to provide an animal trap as aforesaid that presents an animal access opening that is spaced above the ground or surrounding level.

Yet another object of this invention is to provide an animal trap as aforesaid that presents a level and uninterrupted platform adjacent the access opening in the trap for an animal to walk upon.

Still another object of this invention is to provide an animal trap as aforesaid wherein a storage compartment is adjacent the tilting platform and further wherein the tilting platform controls ingress into the trap and into the storage compartment.

Still another object of this invention is to provide an animal trap as aforesaid that automatically resets itself for continued trapping after the animal journeys into the storage compartment of the trap.

Finally, another object of this invention is to provide an animal trap as aforesaid that includes an adaptor communicating the opening of an animal burrow in the ground or in a wall with the access opening of the trap.

DESCRIPTION OF THE DRAWINGS

FIG. 4 is a vertical cross-sectional view taken along line 4—4 of FIG. 3 with the inner partition broken away to reveal the primary platform and booster tilt in their entry positions;

FIG. 5 is a fragmentary, cross-sectional view similar to FIG. 4 but showing the primary platform and booster tilt in their closed positions;

FIG. 6 is a fragmentary, cross-sectional view taken along line 6—6 of FIG. 4 and illustrates the primary platform pivot, parts being broken away to reveal details of construction; and FIG. 7 is a fragmentary, cross-sectional view taken along line 7—7 of FIG. 4 and showing the booster tilt pivotal axis with a portion of the connecting parts broken away to reveal details of construction.

DETAILED DESCRIPTION

Figure 2:
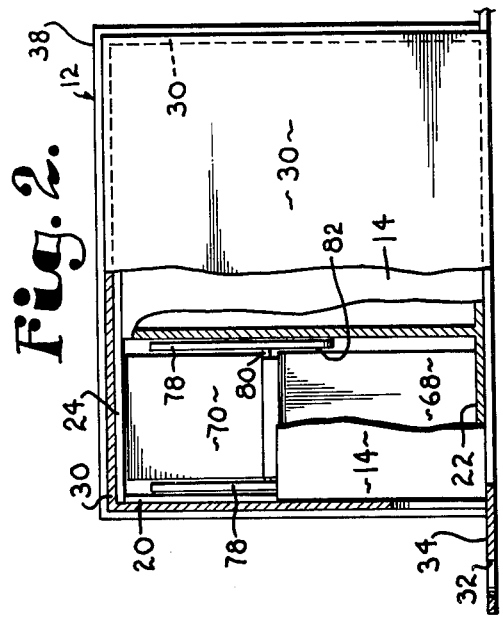
FIG. 2 is a fragmentary end view of the end of the trap in FIG. 1 closest to the viewer with parts broken away to reveal construction.

A multi-trapping animal unit shown in FIGS. 1–7 has a box-like housing 12 including sidewalls 14, 16, 18 and 20, a floor 22 and a rectangular ceiling piece 24. Sidewall 14 has an animal access opening 28 therein spaced a substantial distance above floor 22. In sidewalls 16 and 20 ventilation vents 26 provide circulation in the animal trap 12. Additional vents may be used if desired.

An optional adaptor 30 is attached to the sidewalls 16 and 20 of the box-like housing 12 and encloses sidewall 14 and the access opening 28 therein. The adaptor 30 is designed to communicate the access opening 28 of the trap with the opening of an animal burrow. (An adaptor designed to register with an animal burrow opening in a wall or a ceiling would have an open side or top instead of an open bottom as shown in the adaptor 30 in FIG. 1.) Flanges 32 projecting from the adaptor 30 have holes 34 therein for receiving screws, pegs or other fasteners (not shown) so that the adaptor 30 can be securely mounted over the animal burrow. The adaptor 30 as described would be employed when it is desired to entrap animals that live in burrow holes in a floor. In this case, all that would have to be done is to locate the burrow and align the trap so that the adaptor communicates the burrow opening with the access opening 28.

Figure 1:
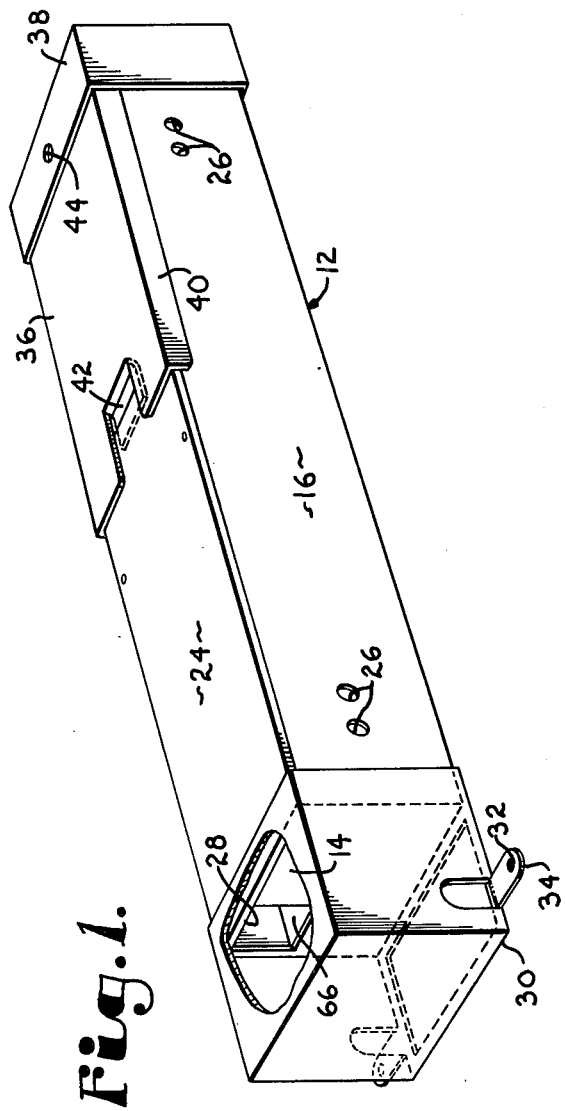
FIG. 1 is a perspective view of the animal trap of the present invention with an optional adaptor shown attached.
Figure 3:
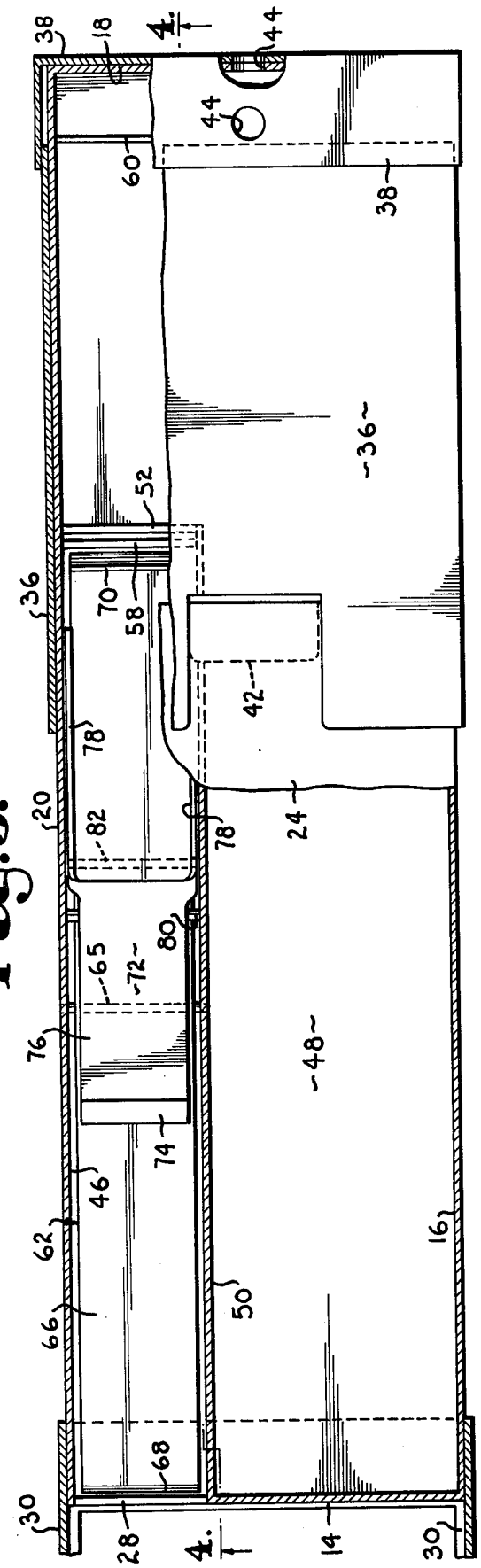
FIG. 3 is a plan view of the trap in FIG. 1 but without the adaptor, with part of the lid and ceiling of the trap broken away to reveal internal details.

The top of the housing 12 includes the rectangular ceiling piece 24, a smaller rectangular lid 36 which is removable and an end cap 38. At one end edge of the lid 36, depending side flanges 40 fit in spaces between cap 38 and sidewalls 16 and 20. A tab 42 is formed in the opposite end of the lid 36. The lid 36 may be inserted into the cap 38 until the tab 42 at the opposite end of the lid 36 is clear of the ceiling 24 and drops therebelow. Once the tab is clear of the ceiling and has dropped below the ceiling, the lid can then be shifted in the opposite direction toward the access opening 28. In FIG. 1 the lid 36 is shown after it is shifted back toward the access opening 28 and is secured both by the cap 38 and by the fact that the tab 42 is now underneath the ceiling 24. This position can be maintained by inserting the shackle of a padlock (not shown) through the aligned holes 44 in cap 32 and in sidewall 18 of the housing 12 shown in FIG. 3.

The housing 12 is divided into a capture compartment 46 and a storage compartment 48. The capture compartment 46 is defined by partial portions of sidewalls 14 and 20 and by a partition 50 and a divider 52. A passage from the capture compartment 46 to the storage compartment 48 is defined by a gap opening which is formed by divider 52 since the upper edge thereof is spaced beneath the lid 36. If multi-trapping of animals is not desired, an obstruction 56 (best shown in broken lines in FIG. 4) is inserted into a vertical slot defined by the divider 52 and a closely adjacent, upright plate 58. Access for insertion of the obstruction 56 into the slot is available once lid 36 thereabove is removed. In the storage compartment 48, a trough 60 is mounted on the interior of sidewall 18. The trough 60 contains feed or water for the captured animal. The food or water may contain poison if desired.

In the capture compartment 46, a primary, elongated platform 62 is adjacent to and aligned with the access opening 28. Beneath the primary platform 62 and intermediate its ends a transverse pivot rod 65 mounts the primary platform 62 for swinging movement about the axis of the rod. The pivot rod 65 is mounted on sidewall 20 and on the partition 50 and spans the same.

The primary platform 62 has a normal, level position and a tilted, capture position. In its normal position the then horizontally disposed ramp or runway portion 66 of the primary platform 62 has one end thereof adjacent the access opening 28. A downward extension 68 at such one end of ramp 66 is in contact with the floor 22 when the primary platform is in its normal position. In the normal position of primary platform 62 the other end of the ramp 66 has an upward extension 70 blocking the gap opening formed by the divider 52 that separates the capture compartment 46 from the storage compartment 48. When the primary platform 62 is in its tilted position, the downward extension 68 blocks the access opening 28 and the upward extension 70 moves below the gap opening thus permitting an animal in the capture compartment 46 to travel into the storage compartment 48. Compare FIGS. 4 and 5.

A tilt booster generally designated 72 is mounted on and carried by the primary platform 62. An inclined edge 74 presented by the tilt booster 72 faces the access opening 28 and engages the pivot rod 65. See FIGS. 3 and 4. The tilt booster 72 includes a plank portion or secondary platform 76 overlying the primary platform 62, one end thereof forming said inclined edge 74. Extending in the opposite direction from the plank portion 76 of the tilt booster are counter-balancing wings 78.

Beneath the plank 76 is a fulcrum rod 80 mounted between the sidewall 20 and the partition 50 and disposed between the plank 76 and primary platform 62. The tilt booster 72 is pivotable about the fulcrum point defined by the fulcrum rod 80 but is not mounted thereto. It should be understood, therefore, that the tilt booster 72 has two points about which it is pivotable. The second point or secondary pivot point is defined by a pivot pin 82 (FIG. 7) received in a transverse opening 84 in the primary platform 62 below the surface thereof. The pin 82 extends through the proximal ends of the wings 78, which project generally toward platform extension 70 along the sidewall 20 and partition 50. Accordingly, the tilt booster 72 is rotatably mounted on and anchored to the primary platform 62 at the secondary pivot point (axis) provided by pin 82.

Alternative structural configurations for the tilt booster are possible. For example, the plank could extend past the fulcrum rod, and the wings and secondary pivot pin could be eliminated. In such modification, the extended plank would be pivotally mounted on the fulcrum rod. In another possible modification the need for counterbalancing wings and a secondary pivot pin could be eliminated by providing the plank at a point past the fulcrum rod with a downwardly extending, L-shaped member received in a slot in the primary platform.

OPERATION

Since the access opening 28 in the housing 12 of the animal trap is above the ground or floor, the animal to enter the trap has to actually climb. This is desirable since many animals such as rodents have a natural climbing instinct. When the animal enters the trap, it sees what appears to be the level primary platform 62. This also is desirable since an animal prefers to advance on level or nearly level surfaces.

When the animal advances along the ramp 66 of the primary platform 62, it will approach the inclined edge 74 of the plank 76 of the tilt booster 72. When the animal first puts its weight on the plank 76, a majority of the weight of the animal is transferred to the primary platform at the line of contact where the inclined edge 74 of the plank 76 engages the primary platform 62. Even when the animal advances to a point on the primary platform 62 past pivot rod 65, its weight in effect is still acting on primary platform 62 at the inclined edge 74. When the animal's center of gravity passes the fulcrum point defined by rod 80, its weight instead of being primarily directed at the inclined edge 74 will be primarily directed at the secondary pivot point (pin 82). At the moment the center of gravity of the animal passes the fulcrum point, the primary platform 62 suddenly tilts downwardly. This is due to the fact that when the primary force of the animal is directed at the secondary pivot point, it is at a point far past the pivotal axis (rod 65) of the primary platform 62. Therefore, downward movement is compelled. Moreover, the plank 76 pivoting at secondary pivot pin 82 swings upwardly and away from the primary platform 62 to the ceiling 24 (FIG. 5) since the plank is resting on the fulcrum rod 80 and the distance between rod 80 and secondary pivot pin 82 is increased due to the fact that pivot pin 82 is moving downwardly and away from the fixed fulcrum rod 80.

The primary platform 62 in its downward tilted position (FIG. 5) has captured the animal. As discussed above, the animal therein is then free to climb into the storage compartment 48. When the animal leaves the capture compartment 46, the primary platform 62 and tilt booster 72 return to their normal ready positions. Automatic return is assured by either weighting the portion of the platform to the left of pivot rod 65 as viewed in FIGS. 4 and 5, or locating pivot rod 65 to the right of center sufficient to cause the return action.

The operation as described permits multi-trapping since animals are successively induced to enter the storage compartment 48. The extension 68 precludes jamming of the device by the next animal, who thus cannot enter until primary platform 62 returns to its normal, ready position. If only a single capture is desired, obstruction 56 is inserted and the components are held in their FIG. 5 positions by the entrapped animal who is enclosed by the ceiling 24 and lid 36, obstruction 56, extension 70, portion of ramp 66 to the right of pivot pin 82, and raised plank 76.

Having thus described the invention, what is claimed as new and desired to be secured by Letters Patent is:

1. An animal trap comprising:
   a housing having a capture compartment therein and an animal access opening communicating with said compartment;
   a primary platform in said compartment having a pair of opposed ends, one of said ends being adjacent said opening;
   pivot means mounting said primary platform intermediate said ends thereof for tilting movement about a pivotal axis between a normal position in which a runway is presented for an animal entering the compartment through said opening, and a tilted, capture position assumed upon sufficient forward advancement of the animal along the runway in a direction toward the other of said ends;

a tilt booster including a secondary platform overlying said primary platform and engaging the same between said axis and said one end when the primary platform is in its normal position; and a fulcrum for said booster engaging said secondary platform and spaced from said axis in said direction of advancement, whereby the booster augments the tilting action of the primary platform when the center of gravity of the animal passes the fulcrum.

2. The trap as claimed in claim 1, further comprising a second pivot means mounting said booster on said primary platform for movement therewith, said second pivot means being spaced from said fulcrum in said direction of advancement.

3. The trap as claimed in claim 2, wherein said fulcrum is fixed and disposed between said primary and secondary platforms to cause said secondary platform to swing upwardly about said second pivot means and away from said primary platform when the latter tilts to its capture position, whereby the entrapped animal is prevented from returning the primary platform to its normal position and escaping.

4. The trap as claimed in claim 2, wherein said booster further includes counterbalancing wings extending from said secondary platform in said direction of advancement.

5. The trap as claimed in claim 1, wherein said primary platform in said capture position blocks said access opening to prevent animal access to said capture compartment.

6. The trap as claimed in claim 1, further comprising a conduit on said housing adapted to communicate an animal burrow opening with said access opening.

7. The trap as claimed in claim 1, wherein said housing also has a storage compartment adjacent said capture compartment and is provided with passage means therebetween, said primary platform blocking ingress and egress to and from said storage compartment through said passage means when said primary platform is in said normal position.

8. The trap as claimed in claim 7, wherein said primary platform in said normal position is at a level attitude and has means blocking said passage means to prevent access to said storage compartment.

9. The trap as claimed in claim 7, further comprising a removable partition insertable in said passage means, whereby a multi-trapping device can be converted into a single trapping unit.

* * * * *